United States Patent [19]
Hanus

[11] Patent Number: 5,310,968
[45] Date of Patent: May 10, 1994

[54] DIGITIZING DEVICE

[75] Inventor: Helfried Hanus, Karlsruhe-Durlach, Fed. Rep. of Germany

[73] Assignee: Pfaff Haushaltmaschinen GmbH, Karlsruhe-Durlach, Fed. Rep. of Germany

[21] Appl. No.: 778,861

[22] PCT Filed: Jun. 20, 1990

[86] PCT No.: PCT/EP90/00975
 § 371 Date: Feb. 6, 1992
 § 102(e) Date: Feb. 6, 1992

[87] PCT Pub. No.: WO90/16044
 PCT Pub. Date: Dec. 27, 1990

[30] Foreign Application Priority Data

Jun. 22, 1989 [DE] Fed. Rep. of Germany ...... 3920429.4

[51] Int. Cl.$^5$ .............................................. G08C 21/00
[52] U.S. Cl. .......................................................... 178/18
[58] Field of Search .............................. 178/18, 19, 20; 340/706, 708, 707, 705; 364/709.11

[56] References Cited
U.S. PATENT DOCUMENTS

| 3,347,986 | 10/1967 | Gilbert | 178/18 |
| 3,636,256 | 1/1972 | Cameron | |
| 4,575,581 | 3/1986 | Landberg | 178/18 |
| 4,916,740 | 4/1990 | Nada et al. | 178/18 X |

FOREIGN PATENT DOCUMENTS 1549683 5/1971 Fed. Rep. of Germany.
1943217 5/1973 Fed. Rep. of Germany.
1180882 2/1970 United Kingdom.

Primary Examiner—Curtis Kuntz
Assistant Examiner—Paul Loomis
Attorney, Agent, or Firm—McGlew and Tuttle

[57] ABSTRACT

Digitizing device for manually determining position data of a line drawn on a worksheet. The digitizing device is provided with a base plate for receiving a worksheet containing a line, a cross carriage consisting of a carriage and a slider with a final control element, transmission members between the cross carriage and a position element that determines the position of the final control element in relation to signal recorders, as well as a releasing member that can be actuated manually to send the position data determined by the signal recorders to a circuit. To achieve simple design embodiment along with stable and accurate mounting of the guide members, the guide between the carriage (18) and the housing (1) has a V-shaped guideway (14) and a horizontal guideway (20a) for three support rollers (15, 22) mounted on the carriage (18); the support rollers (15, 22) are arranged in an acute triangle, wherein two of them are associated with one guideway (14 or 20a), and the third one is arranged on the other guideway (14 or 20a), and the support roller (15) cooperating with the V-shaped guideway (14) is mounted at an oblique angle.

6 Claims, 5 Drawing Sheets

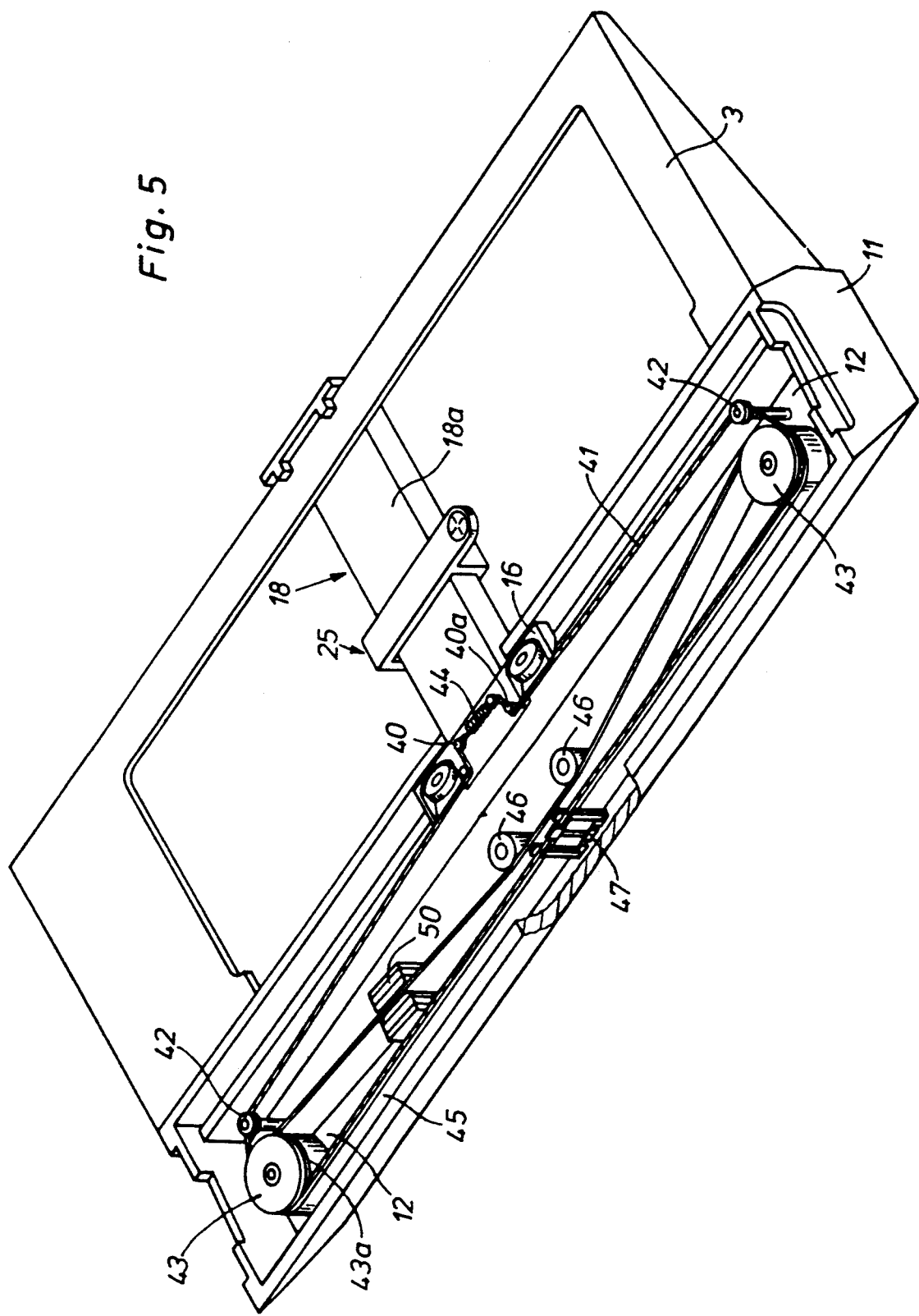

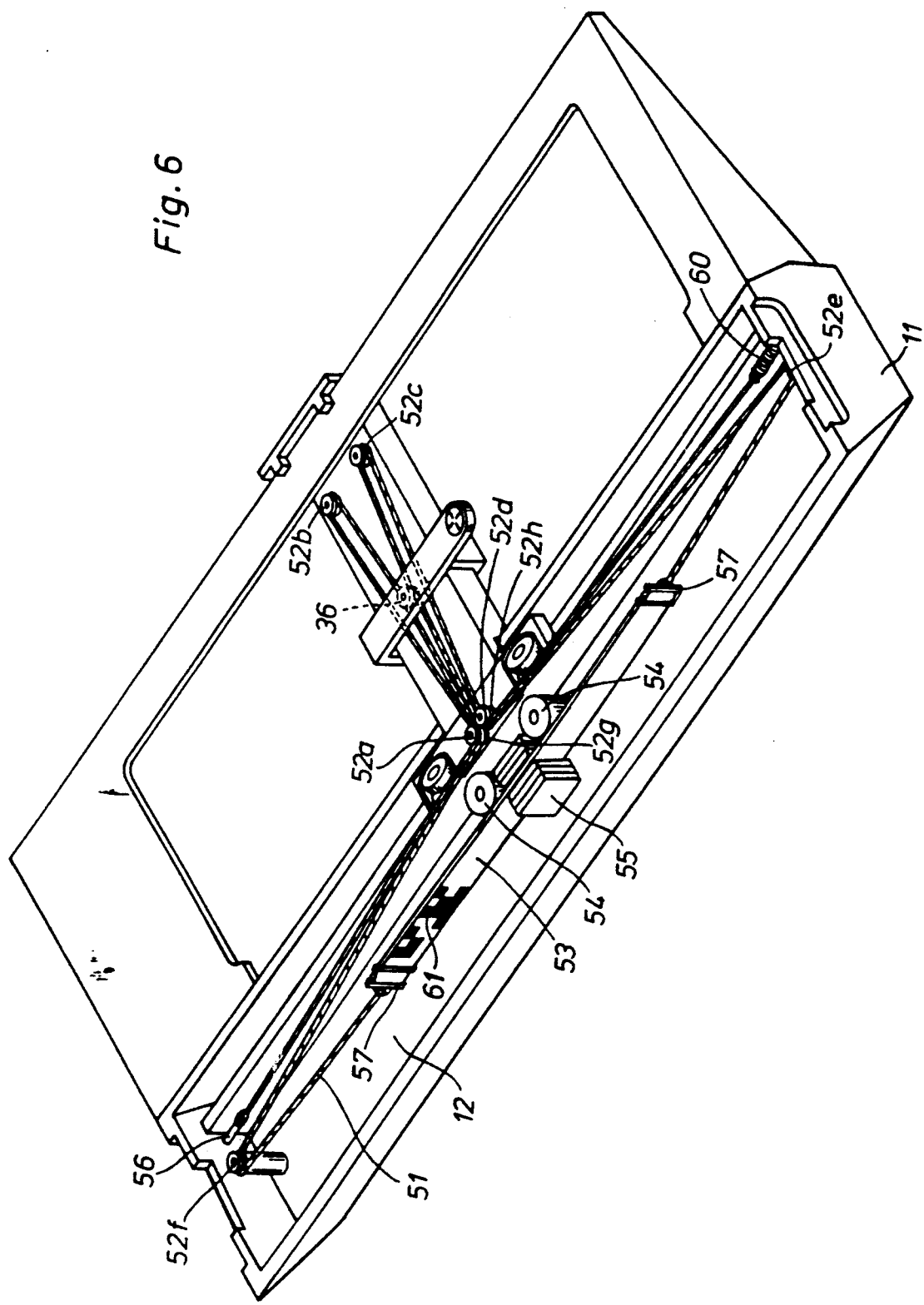

DIGITIZING DEVICE

FIELD OF THE INVENTION

The present invention pertains to a digitizing device for detecting individual points on a line, with a base plate for receiving a worksheet on which a line is drawn, a cross carriage formed of a carriage and a slider, which cross carriage is manually adjustable to individual points of the line over the base plate in the directions of the X and Y coordinates in order to adjust a final control element connected to the slider, with transmission elements between the cross carriage and position indicating members for determining the position of the final control element in relation to signal recorders, and with a release element that can be actuated manually to send the position data determined by the signal recorder to a circuit.

BACKGROUND OF THE INVENTION

In such a digitizing device, as has become known from, e.g., West German Patent No. DE-PS 19,43,217, the scanning element is moved manually in two mutually perpendicular coordinate directions over a defined curve path. At predetermined points on this curve path, coordinate signals, which correspond to the actual position of the scanning element, are generated automatically or manually via a release element. These signals are sent to a memory.

The prior-art digitizing devices have a highly sophisticated design and are therefore expensive.

SUMMARY AND OBJECTS OF THE INVENTION

It is an object of the present invention is to provide a digitizing device for detecting individual points on a line, with a base plate for receiving a worksheet on which a line is drawn, a cross carriage formed of a carriage and a slider, which cross carriage is manually adjustable to individual points of the line over the base plate in the directions of the X and Y coordinates in order to adjust a final control element connected to the slider, with transmission elements between the cross carriage and position indicating members for determining the position of the final control element in relation to signal recorders, and with a release element that can be actuated manually to send the position data determined by the signal recorder to a circuit wherein the arrangement has a compact design, is simple and portable, and is easy to operate.

According to the invention, a digitizing device is provided for detecting individual points of a continuous line. The device includes a base plate for receiving a worksheet on which the continuous line is drawn and the device includes a cross slide including a carriage and a slider and which is adjustable in X and Y coordinate directions for manually adjusting an adjusting member connected to the slide to individual points of the continuous line over the base plate. Transmission elements are provided between the cross line and the position-indicating elements for determining the position of the adjusting member in relation to signal sensors. A releasing element that can be operated manually for sending the position data determined by the signal sensors to a circuit is also provided. A guide between the carriage and the housing of the digitizing devices provided with two horizontally extending guideways for three roller bearings connected to the carriage. The guideway has a V-shaped running track that is open at the top. Roller bearings connected to the carriage are designed as simple support rollers of which two support rollers are mounted obliquely at an angle and are associated with the V-shaped guideway while the third support roller is associated with the other guideway.

Despite a simple design, the arrangement according to the present invention leads to a clearance-free connection between the final control element carrying the cross hairs, the cross carriage, and the film strip, so that the coordinate points to be recorded from the worksheet can be detected reproducibly by the signal recorder.

The feature of the invention including providing the horizontal guideway as part of a running rail of a truncated cone-shaped cross section, whose lateral surface is used to guide a correspondingly designed groove in the carriage and providing the carriage to carry another support roller which is elastically supported on a guideway that is arranged on the upper part of the housing and extends over the carriage makes it possible to secure the position of the cross carriage during tilting of the device in a particularly simple manner, and this additionally increases the freedom from clearance.

The provisions of the invention including a middle part of the carriage being designed as a guide for the slide, which surrounds the middle part and is supported via sliding lugs on the surface of the middle part and forming the carriage with a V-shaped groove extending at rights angles to the two guideways for accommodating a V-shaped sliding piece mounted elastically in the slide, is favorable for a simple design of the cross carriage.

The feature of the invention wherein the carriage and the slider are each connected by a cable to a film strip wherein the cable is guided by deflecting rollers wherein the film strip carries code tracks with periodically occurring bit patterns and which film strips cooperate, longitudinally displaceably in an area provided to the side from the path of a carriage, with the signal recorders provided in this area as well as providing that adjacent to the lateral area the carriage carries deflecting rollers for the cable of the slider and the connection between the film strips and the associated cable is insured by a self locking film clips provides an arrangement wherein the cable guidance is displaced, with the exception of the part extending in the slider, into the lateral longitudinal housing of the device, and the work surface above the worksheet is thus kept free.

The use of special connection members between the cable and the film strip wherein each cable is tension by a tension spring is favorable for both a simple and reliable manner of connection and easy adjustment of the film strip.

BRIEF DESCRIPTION OF THE DRAWINGS

The present invention will be explained on the basis of an exemplified embodiment represented in the drawing. Here.

FIG. 1a is a partially cut-away side view of point A in FIG. 1;

FIG. 5 is a perspective view of the upper part lifted off, from the inside, wherein only the cable driven by the slider is shown;

FIG. 6 is a view corresponding to FIG. 5, wherein only the cable connected to the slider is shown.

DETAILED DESCRIPTION OF THE PREFERRED EMBODIMENT

Figure 1:
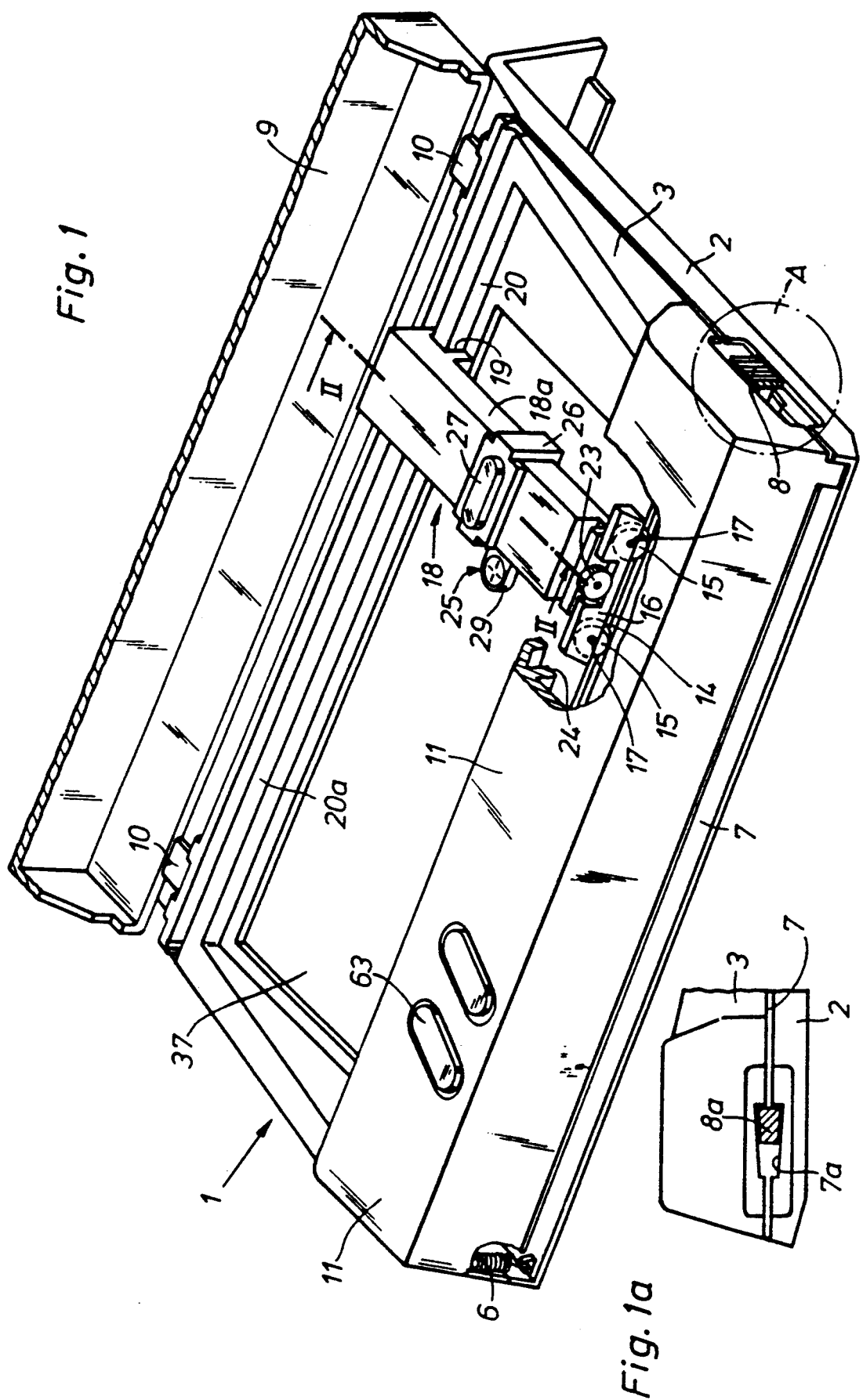
FIG. 1 is a partially cut-away, perspective top view of the digitizing device with the cover opened.
Figure 2:
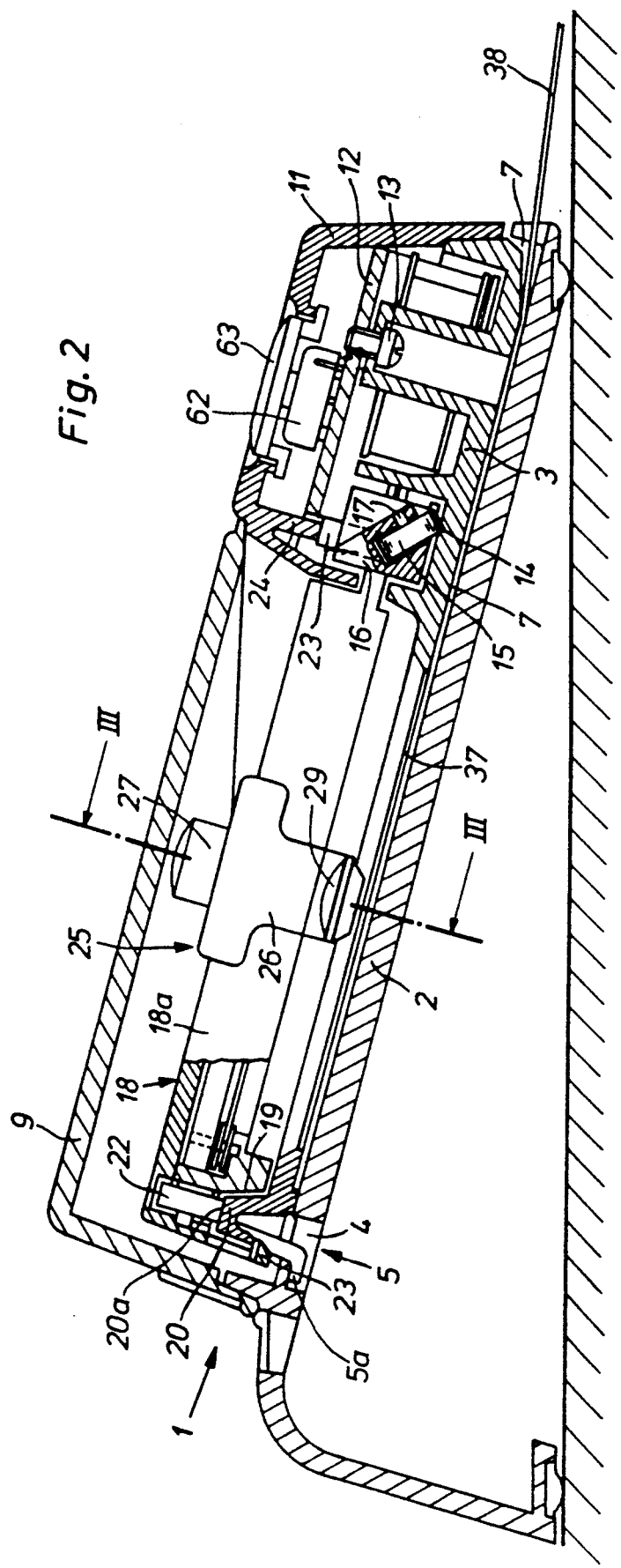
FIG. 2 is a sectional view taken along line II—II in FIG. 1.

As is shown in FIGS. 1 and 2, the digitizing device has a housing 1, which consists of a base plate 2 and an upper part 3, which are connected to one another by two hinges 5 which are arranged on the rear side of the upper part 3 and are formed by brackets 5a extending into corresponding recesses 4 in the base plate 2. The upper part 3 is pulled toward the base plate 2 by two tension springs 6 arranged in front on the sides of the base plate 2 and the upper part 3. The gap 7 existing between them expands, in one part of the side zone, into a wedge gap 7a (FIG. 1a) each, which is engaged by a pushing wedge 8a each of a slider 8.

A cover 9 is connected to the base plate 2 via two plug type hinges 10 so that it can be opened.

A box-like container 11 for accommodating members to be described later is fastened on the upper part 3. The container 11 is closed off in the downward direction by a bottom plate 12, which is connected to the upper part 3 by screws 13. The upper part 3 contains a V-shaped guideway 14, one wall of which forms the track for two support rollers 15. These are mounted on shafts 17 fastened obliquely in a support 16. The support 16 is fastened to a carriage 18, which has, at its end facing away from the support 16, a truncated cone-shaped groove 19, which surrounds a runner 20 of truncated cone-shaped cross section in the upper part 3. A guideway 20a, on which a support roller 22 mounted in the carriage 18 lies, is provided on the runner 20. The support rollers 15 and 22 are arranged in an acute triangle in order to guarantee stable support for the carriage 18. The outer wall of the runner 20 is partially cut out, so that a locking strip 23 provided on the outer wall of the groove 19 is able to snap in under the cutout part of the wall of the runner 20.

On the top side of the carriage 18, another support roller 23, which is supported with weak pressure on a guideway 24 provided on the container 11 and thus guarantees clearance-free guiding of the support rollers 15 and 22 during the longitudinal displacement of the carriage 18, is mounted between the two support rollers 15, but somewhat farther in the direction of the support roller 22. The support rollers 15, 22, and 23 are designed as rolling bearings.

Figure 3:
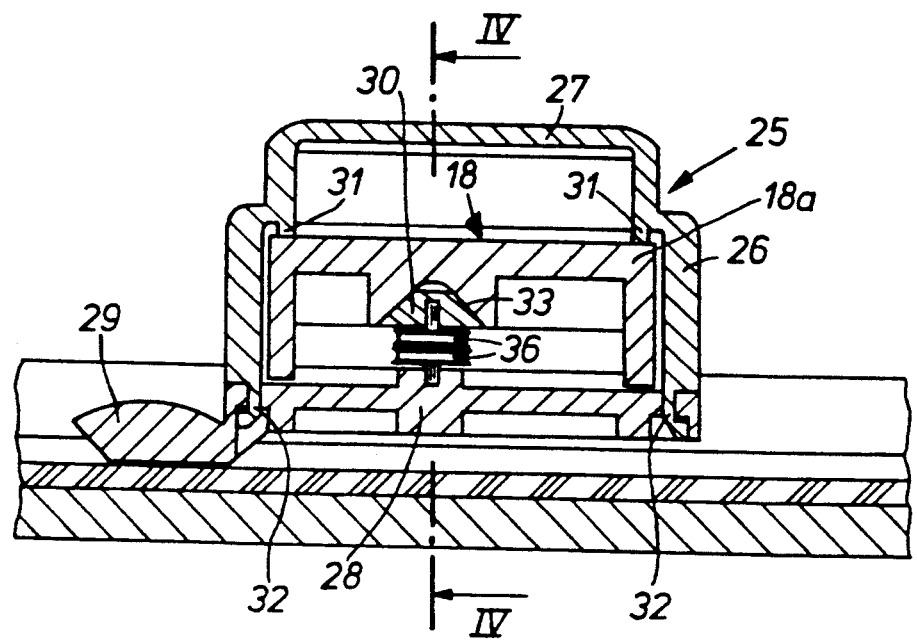
FIG. 3 is a sectional view taken along line III—III in FIG. 2.
Figure 4:
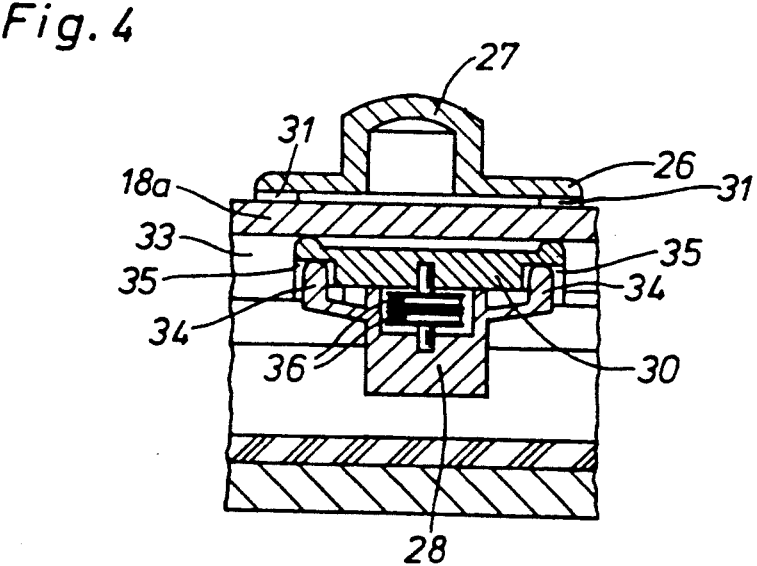
FIG. 4 is a sectional view taken along line IV—IV in FIG. 3.

The carriage 18 (FIGS. 3 and 4) has a middle part 18a which is provided as a parallel guide for a slider 25 arranged movably at right angles to the longitudinal axis of the carriage 18. This slider 25 consists of a guide member 26 with a handgrip 27, a bottom member 28 with a final control element 29 connected to it on the side, and a sliding block 30. The final control element 29 is designed as a magnifying glass and contains so-called cross hairs.

The guide member 26 surrounds the middle part 18a of the carriage 18, wherein four guide lugs 31 lie on the top side of the middle part 18a, and it is locked with the bottom member 28 arranged under the middle part 18a by detents 32. The bottom member 28 carries the sliding block 30 guided in a keyway 33 provided in the middle part 18a. This sliding block 30 is connected to the bottom member 28 by two locking tongues 34, which engage corresponding locking grooves 35 of the sliding block 30 and hold this elastically in contact with the keyway 33. Two pulleys 36, which are arranged one on top of another, and whose function will be explained later, are mounted in the sliding block 30.

The upper part 3 (FIG. 1 and 2) has a cutout 37, which is dimensioned so that a support surface is formed on the base plate 2 for a worksheet 38, which is designed as a grid sheet that can be pushed in between the base plate 2 and the upper part 3, and the final control element 29 connected to it can be moved over the support surface during the lateral movement of the carriage 18 and the movement of the slider 25 directed at right angles to the above movement.

A pin 40, to which one end of a cable 41 is attached, is fastened to the support 16 connected to the carriage 18 (FIG. 5). This cable 41 runs over two deflecting rollers 42 mounted on the side in the upper part 3 and one thread groove 43a each in two guide rollers 43 located adjacent to the thread grooves 43a. The other end of the cable 41 is connected via a spring 44 to the pin 40, and the area located in front of the end of the cable 41 is led over a deflecting means 40a provided on the support 16.

A film strip 45, which is deflected by two guide rollers 46 and whose ends are looped around deflecting webs of a holder 47, is guided over the two guide rollers 43. After tensioning the film strip 45, its ends are secured by gluing. After alignment of the cable 41 with the film strip 45, the ends of the cable 41 are also secured in their positions on the holder 47 by gluing. The film strip 45 moves through a signal recorder 50, which is fastened in the bottom plate 12 of the container 11.

To transmit the movement of the carriage 18, a cable 51 (FIG. 6) is provided, which moves via deflecting rollers 52a through 52h mounted in the bottom plate 12 and over the thread grooves 36 mounted in the slider 25, and which is connected to a film strip 53 via two holders 57 at its ends. The film strip 53 is guided over two guide rollers 54 and moves through a signal recorder 55. The cable 51, which is suspended in an eye 56 fastened in the container 11, moves over the deflecting rollers 52a and 52b, one of the deflecting rollers 36, the deflecting rollers 52c through 52g, the other deflecting roller 36, and the deflecting roller 52h, as well as a deflecting pin 58, and to a spring 60 fastened in the container 11.

It is achieved due to this arrangement of the cable 51 that displacement of the slider 25 on the carriage 18 brings about a corresponding longitudinal movement of the film strip 53 connected to the cable 51, and when the length of the loop of the cable 51 led around the pulley 36 decreases, the length of the loop led around the pulley 36 is increased by the same amount, and vice versa. This change in the length of the respective loops of the cable 51 during the movement of the slider 25 brings about a corresponding displacement of the film strip 53 through the signal recorder 55, and the transmission of movement between the slider 25 and the film strip 53 corresponds to a ratio of 1:2.

The film strips 45 and 53 have code patterns consisting of light-dark fields, which are distributed among a plurality of code tracks 61 on the film strip 53 and can be scanned by the signal recorders 50 and 55. The number of the code tracks 61 on the film strip 53 is an even number, so that the cable 51 located longitudinally in the center extends outside the code tracks 61.

The signal recorders 50 and 55 are connected via conductors to an electronic circuit 62 (FIG. 2), which is arranged on the bottom plate 12 and is accommodated in the container 11. The circuit 62 is connected via another conductor to an input element 63 that can be actuated manually as a key and is integrated in the container 11 in the upper part 3. In addition, the circuit 62 can be connected via a line to a memory, not shown, of an electronic recording device, e.g., an electronic programming unit contained in a sewing machine for free programming of stitches of a sewing pattern.

When actuating the input element 63, the signal recorders 50 and 55 can be activated so that they will send a signal corresponding to the light-dark fields of the actual position of the individual code tracks 61 of the two film strips 45 and 53 to the memory.

The digitizing device operates as follows:

After drawing, on the worksheet 38, the coordinate points of a line, which correspond to the subsequent touchdown points of a sewing pattern to be produced on a sewing machine, the gap 7 between the base plate 2 and the upper part 3 of the housing 1 is enlarged on its front side by pushing back the slider 8. The worksheet 38 can now be pushed into the gap 7, aligned in the cutout 37 of the upper part 3, and clamped between the upper part and the base plate by pushing the slider 8 forward.

The final control element 29 is displaced with its cross hairs over the successive coordinate points of the worksheet 38 by moving the handgrip 27, while the input element 63 is actuated each time.

When displacing the carriage 18 in the longitudinal direction, the support 16 displaces, via the cable 41, the film strip 45 connected to it through the signal recorder 50, so that the bit pattern of the code track 61, which bit pattern corresponds to the x coordinate of the selected position point, is located in its measurement range.

When displacing the slider 25 on the carriage 18, the length of one loop of the cable 51 around one pulley 36 increases, while the length of the other loop around the other pulley 36 decreases. This causes, e.g., when the carriage 18 is stopped and the slider 25 is moving toward the box 11, the film strip 53 fastened to the cable to be pushed to the right through the signal recorder 55.

During the movement of the carriage 18 without simultaneous displacement of the slider 25 on the carriage 18, the cable 51 rolls over the deflecting rollers 52a through 52d, 52g through 52h as well as the pulleys 36, without being moved within the area carrying the film strip 55. Thus, in each position of the final control element 29 above the worksheet 38, the bit pattern of the code tracks 61 of the two film strips 45 and 53, which bit pattern corresponds to the subjacent coordinate point of the sewing pattern, is located in the measurement range of the respective signal recorder 50 and 55. By actuating the input element 63 when the cross hairs of the final control element 29 coincide with a coordinate point on the worksheet 38, the code value corresponding to this point is sent to the circuit 62 and is sent from there, after processing, to the memory of the sewing machine.

While a specific embodiment of the invention has been shown and described in detail to illustrate the application of the principles of the invention, it will be understood that the invention may be embodied otherwise without departing from such principles.

I claim:

1. A digitizing device for detecting individual points of a continuous line, comprising:

a housing with a base plate for receiving a worksheet on which the continuous line is drawn; a cross slide including a carriage and a slide and an adjusting member connected to said slide, said cross slide being adjustable in directions of X and Y coordinates for manually adjusting a position of said adjusting member to individual points of the continuous line over the base plate; position-indicating element means for determining the position of said adjusting member; signal sensors for sensing said position-indicating elements; transmission elements connecting said cross slide to said position indicating elements for moving said position-indicating elements relative to said signal sensors; circuit means for receiving signals from said sensors relating to a position of said a position-indicating elements; a manually operating releasing element connected to said sensors and said circuit for sending position data determined by said signal sensors to said circuit; a guide provided between said cross slide and said housing, said guide including two horizontally extending guideways, one of said guideways having a V-shaped running track open at a top side; roller bearings connected to said carriage defining simple support rollers, two of said support rollers being mounted obliquely at an angle with respect to horizontal, said two support rollers being positioned in said V-shaped guideway, another of said horizontally extending guideways receiving a third support roller.

2. Digitizing device according to claim 1, wherein said another of said horizontally extending guideways defines a running rail of truncated cone-shaped cross section with lateral surfaces used to guide a correspondingly designed groove formed in said carriage.

3. Digitizing device according to claim 1, wherein said carriage is provided with another support roller, said housing having an upper part with another guideway, said carriage carrying said another support roller elastically supported by said another guideway, said another guideway extending over said carriage.

4. Digitizing device according to claim 3, wherein each of said two support rollers said third support roller and said another support roller are designed as roller bearings.

5. Digitizing device according to claim 1, wherein said carriage has a middle part forming a guide for said slide, said slide surrounding said middle part and being supported by sliding lugs on a surface of said middle part.

6. Digitizing device according to claim 1, wherein said carriage has a V-shaped groove extending at right angles to said two guideways, said V-shaped groove accommodating a V-shaped sliding piece mounted elastically in said slide.

* * * * *